(12) United States Patent
Xiong et al.

(10) Patent No.: US 10,345,819 B2
(45) Date of Patent: Jul. 9, 2019

(54) RECHARGING ROBOT SYSTEM

(71) Applicant: UBTECH Robotics Corp, Shenzhen (CN)

(72) Inventors: Youjun Xiong, Shenzhen (CN); Libing Zhou, Shenzhen (CN); Jibang Cui, Shenzhen (CN); Gaobo Huang, Shenzhen (CN)

(73) Assignee: UBTECH ROBOTICS CORP., Shenzhen (CN)

(*) Notice: Subject to any disclaimer, the term of this patent is extended or adjusted under 35 U.S.C. 154(b) by 83 days.

(21) Appl. No.: 15/839,837

(22) Filed: Dec. 12, 2017

(65) Prior Publication Data

US 2019/0049983 A1 Feb. 14, 2019

(30) Foreign Application Priority Data

Aug. 14, 2017 (CN) .......................... 2017 1 0694336

(51) Int. Cl.
*G06F 19/00* (2018.01)
*G05D 1/02* (2006.01)
*B60L 11/18* (2006.01)
*H02J 7/00* (2006.01)
*B25J 19/00* (2006.01)

(52) U.S. Cl.
CPC .......... *G05D 1/0225* (2013.01); *B25J 19/005* (2013.01); *B60L 11/1816* (2013.01); *G05D 1/0255* (2013.01); *H02J 7/0042* (2013.01); *Y10S 901/01* (2013.01)

(58) Field of Classification Search
USPC .................................................. 700/249, 245
See application file for complete search history.

(56) References Cited

U.S. PATENT DOCUMENTS

| | | | |
|---|---|---|---|
| 8,594,840 B1* | 11/2013 | Chiappetta et al. | |
| 10,265,859 B2* | 4/2019 | Deyle et al. | |
| 2005/0010330 A1* | 1/2005 | Abramson et al. | |
| 2008/0039974 A1 | 2/2008 | Sandin et al. | |
| 2008/0281470 A1* | 11/2008 | Gilbert, Jr. et al. | |
| 2010/0305752 A1* | 12/2010 | Abramson | |
| 2012/0116588 A1* | 5/2012 | Lee et al. | |
| 2017/0225336 A1* | 8/2017 | Deyle et al. | |
| 2017/0344014 A1* | 11/2017 | Wu | |
| 2019/0011413 A1* | 1/2019 | Caussy et al. | |

* cited by examiner

*Primary Examiner* — Masud Ahmed

(57) ABSTRACT

The present disclosure relates to a recharging robot system. The recharging robot system may include a signal emission device including at least one signal emission channel. The at least one signal emission channel each comprises an opening. A distance between two central axes of any two adjacent signal emission channels is gradually increased along a direction facing away the signal emitters. As such, an overlapping area of signal ranges of the at least two signal emitters may be reduced, and the robot may accurately determine which signal range that the robot is within, so as to accurately align with the recharging dock.

18 Claims, 4 Drawing Sheets

RECHARGING ROBOT SYSTEM

CROSS REFERENCE TO RELATED APPLICATIONS

This application claims priority to Chinese Patent Application No. 201710694336.6, filed Aug. 14, 2017, which is hereby incorporated by reference herein in its entirety.

BACKGROUND

1. Technical Field

The present disclosure relates to an intelligent terminal field, and more particularly to a recharging dock for a robot and a robot system.

2. Description of Related Art

With the evolution of intelligent terminals, the intelligent robots have been a part of human's daily life.

Recharging is a key issue to operate the intelligent robots. Conventionally, the intelligent robot may search a recharging dock by performing a self-positioning process, and may automatically move to the recharging dock for recharging. As such, the intelligent robot may perform a recharging process automatically, and users have no need to manually recharge the intelligent robot. However, if an alignment between the intelligent robot and the recharging dock is not accurate, the recharging process may not be properly performed.

DETAILED DESCRIPTION

To clarify the purpose, technical solutions, and the advantages of the disclosure, embodiments of the invention will now be described more fully hereinafter with reference to the accompanying drawings, in which embodiments of the invention are shown. The figure and the embodiment described according to figure are only for illustration, and the present disclosure is not limited to these embodiments. It should be noted that the relational terms herein, such as "first" and "second", are used only for differentiating one entity or operation, from another entity or operation, which, however do not necessarily require or imply that there should be any real relationship or sequence. Moreover, the terms "comprise", "include" or any other variations thereof are meant to cover non-exclusive including, so that the process, method, article or device comprising a series of elements do not only comprise those elements, but also comprise other elements that are not explicitly listed or also comprise the inherent elements of the process, method, article or device. In the case that there are no more restrictions, an element qualified by the statement "comprises a . . . " does not exclude the presence of additional identical elements in the process, method, article or device that comprises the said element.

Figure 1:
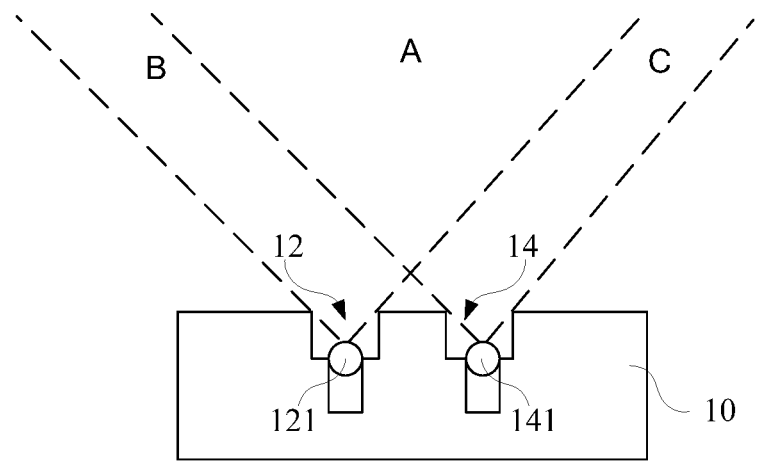
FIG. 1 is a schematic view of one signal emission device of a recharging dock for a robot.

FIG. 1 disclosure relates to illustrate a signal emission device 10 of a recharging dock for a robot. The signal emission device 10 may include a first signal emission channel 12, a second signal emission channel 14, a first signal emitter 121 configured in the first signal emission channel 12, and a second signal emitter 141 configured in the second signal emission channel 14.

Referring to FIG. 1, the first signal emission channel 12 and the second signal emission channel 14 are arranged in parallel, and spaced from each other. As shown in FIG. 1, signals emitted from the signal emitter arranged within an opening may form an arc sector. Specifically, the arc sector is defined by a first extending line from a center of the signal emitter to one edge of the opening, and by a second extending line from the center of the signal emitter to another edge of the opening.

It is noted that different signal emitters may emit different signals. For example, the first signal emitter 121 and the second signal emitter 141 may emit the signals in different frequencies. The first signal emitter is configured to emit first signals outward through the first opening, and the second signal emitter is configured to emit second signals through outward the second opening. When performing a recharging process for the robot, a current position of the robot may be determined according to the received first or second signals from the signal emitters, wherein the different signals may indicate different signal ranges. That is, the robot may determine whether the current position is within an area (B) of a first arc sector corresponding to the first signal emitter 121, or within an area (C) of a second arc sector corresponding to the second signal emitter 141, or within an overlapping area (A) of the first and second arc sectors.

For example, when the robot moves toward the recharging dock and the current position is determined within the overlapping area (A), the robot may keep moving forward. If the current position is determined to be within the area (B), the robot may move along a left-front direction. If the current position is determined to be within the area (C), the robot may move along a right-front direction.

Referring to FIG. 1, if a distance between the two signal emitters is reduced, an overlapping area of the signal ranges of the two signal emitters may be enlarged. For example, when the robot is within the overlapping area (A), the robot may simultaneously receive the signals emitted from the first signal emitter 121 and the signals emitted from the second signal emitter 141. However, if the overlapping area (A) is too large, the current position may not be determined accurately, and the robot may be difficult to align with the recharging dock.

Figure 2:
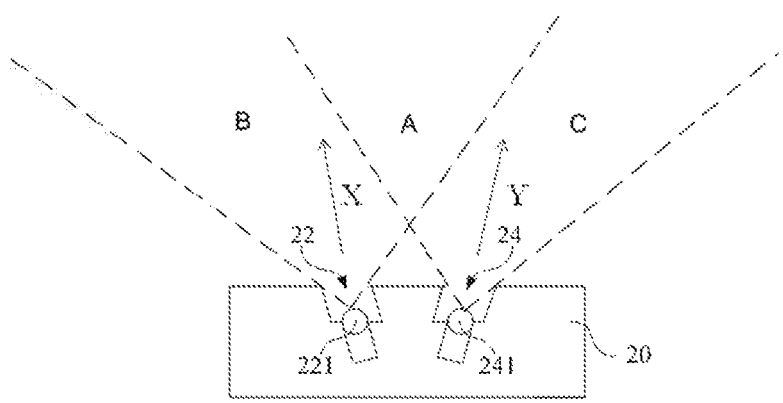
FIG. 2 is a schematic view of a signal emission device of a recharging dock for a robot in accordance with one embodiment of the present disclosure.

Referring to FIG. 2, the present disclosure relates to the recharging dock for the robot. The recharging dock may include a signal emission device 20.

In one example, the recharging dock may include at least one signal emission channel and at least one signal emitter. The signal emission device 20 may include a first signal emission channel 22 and a second signal emission channel 24. The first signal emission channel 22 and the second signal emission channel 24 may respectively include a first opening and a second opening.

The signal emission device 20 may include at least one first signal emitter 221 and at least one second signal emitter 241 respectively arranged within the first opening and the second opening. Signals emitted from the first signal emitter 221 and the second signal emitter form a corresponding arc sector. The arc sector areas (B) and (C) define a first signal central axis (X) and a second signal central axis (Y), respectively. A first distance between a center point of the first opening and a center point of the second opening is greater than a second distance between a center point of the first signal emitter 221 and a center point of the second signal emitter 241. Also, the first signal central axis (X) and the second signal central axis (Y) are gradually spaced apart from each other when away from the first signal emitter 221 and the second signal emitter 241. As such, a certain angle is formed by the extending lines of the signal emission channels.

The certain angle may be formed by the extending lines of the first signal emission channel 22 and the second signal emission channel 24.

As shown in FIG. 2, the first distance between the center point of the first opening and the center point of the second opening is greater than the second distance between the center point of the first signal emitter 221 and the center point of the second signal emitter 241. Due to a configuration of the first opening and the second opening, the overlapping area of the signal ranges corresponding to the first signal emission channel 22 and the second emitting channel 24 may be reduced. It can be seen that a dimension of the overlapping area (A) in FIG. 2 is smaller than that of the overlapping area (A) in FIG. 1.

In another example, an extending direction of the first signal emission channel 22 may be the same with an extending direction of the first signal emission channel 12 as shown in FIG. 1, and the first distance between the center point of the first opening and the center point of the second opening is greater than the second distance between the center point of the first signal emitter 221 and the center point of the second signal emitter 241.

Figure 3:
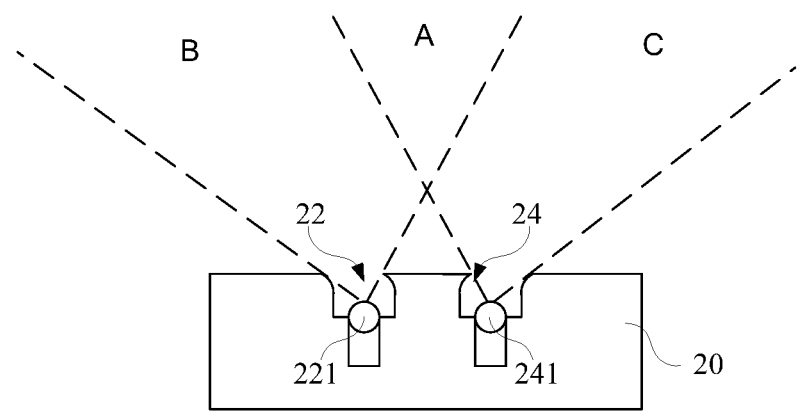
FIG. 3 is a schematic view of a signal emission device of a recharging dock for a robot in accordance with another embodiment of the present disclosure.

In another example, as shown in FIG. 3, the first signal emission channel 22 and the second emitting channel 24 may not extend along a straight line. For example, the first signal emission channel 22 and the second emitting channel 24 each may have two sections. The first signal emission channel 22 and the second emitting channel 24 are arranged in parallel with each other in first sections of the channels, and space apart from each other in second sections of the channels. As such, the first distance between the center point of the first opening and the center point of the second opening is greater than a second distance between the center point of the first signal emitter 221 and the center point of the second signal emitter 241. Thus, the overlapping area of the signal ranges of the first signal emitter 221 and the second emitter 241 may be reduced.

In view of the above, the present disclosure relates to the recharging dock for the robot, including the signal emission device. The signal emission device may include: at least two signal emitters and at least two signal emission channels. Each of the signal emission channels is arranged with at least one signal emitter. The first distance between the center point of the first opening and the center point of the second opening is greater than the second distance between the center point of the first signal emitter and the center point of the second signal emitter. The overlapping area of the signal ranges of the at least two signal emitters may be reduced, and the signal range that the robot is located within may be accurately determined. The different signal ranges may respectively correspond to different signal emitters. As, such, the robot may align with the recharging dock more accurate, and the signal range of the total signal emitters may be enlarged to ensure the signals emitted from the signal emitters may be received by the recharging dock when the robot is located far away from the recharging dock.

Figure 4:
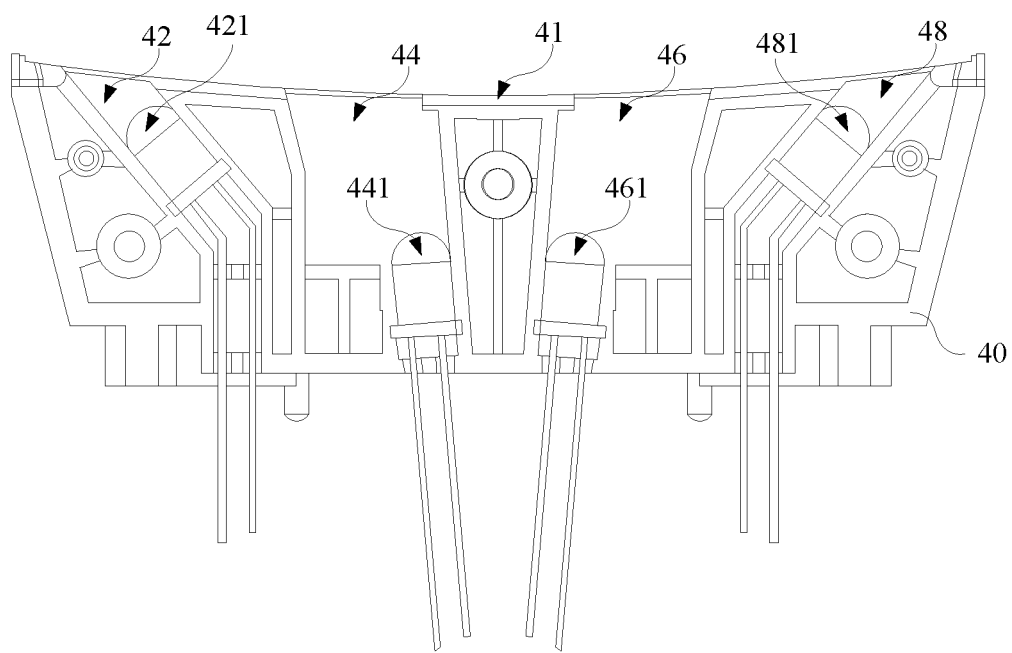
FIG. 4 is a schematic view of a signal emission device of a recharging dock for a robot in accordance with another embodiment of the present disclosure.

As shown in FIG. 4, the present disclosure further relates to a signal emission device 40, including: a first signal emission channel 42, a second signal emission channel 44, a third signal emission channel 46, and a fourth signal emission channel 48.

The first signal emission channel 42 is arranged with the first signal emitter 421. The second signal emission channel 44 is arranged with the second signal emitter 441. The third signal emission channel 46 is arranged with a third signal emitter 461. The fourth signal emission channel 48 is arranged with a fourth signal emitter 481. Each of the signal emitters are configured to emit corresponding signals outward through the corresponding openings.

In one example, the first signal emission channel 42 and the fourth signal emission channel 48 are configured to be symmetrical to each other, and a first angle is formed by the extending lines of the first signal emission channel 42 and the fourth signal emission channel 48. The second signal emission channel 44 and the third signal emission channel 46 are configured to be symmetrical to each other, and a second angle is formed by the extending lines of the second signal emission channel 44 and the third signal emission channel 46.

In on example, the second angle is less than the first angle.

In one example, each of the first signal emission channel 42, the second signal emission channel 44, a third signal emission channel 46, and a fourth signal emission channel 48 is arranged with a central axis.

A distance between two central axes of any two adjacent signal emission channels is gradually increased along the direction facing away the signal emitters signal emitters.

As shown in FIG. 4, a shield plate 41 may be arranged on openings of the second signal emission channel 44 and the third signal emission channel 46. The shield plate 41 is configured to partially cover the openings of the second signal emission channel 44 and the third signal emission channel 46. As such, the overlapping area of the signal ranges of the two signal emitters may be reduced.

When the second angle formed by the extending lines of the second signal emission channel 44 and the third signal emission channel 46 is reduced, the overlapping area of the signal ranges of the second signal emitter 441 and the third signal emitter 461 may be reduced. As such, the robot may accurately determine whether it is located within a signal range of the second signal emitter 441 or within a signal range of the third signal emitter 461. So as to accurately align the robot with the recharging dock.

Figure 5:
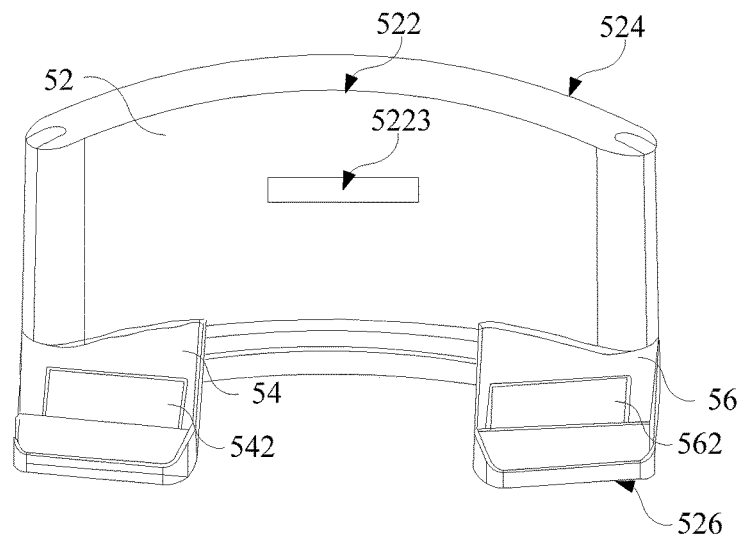
FIG. 5 is a schematic view of a recharging dock for a robot in accordance with one embodiment of the present disclosure.
Figure 6:
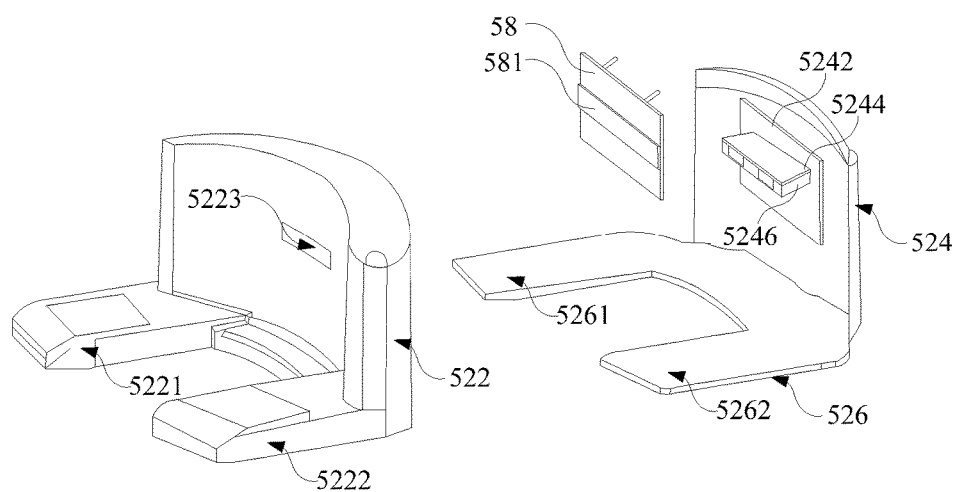
FIG. 6 is a schematic view of a recharging dock for a robot in accordance with another embodiment of the present disclosure.
Figure 7:
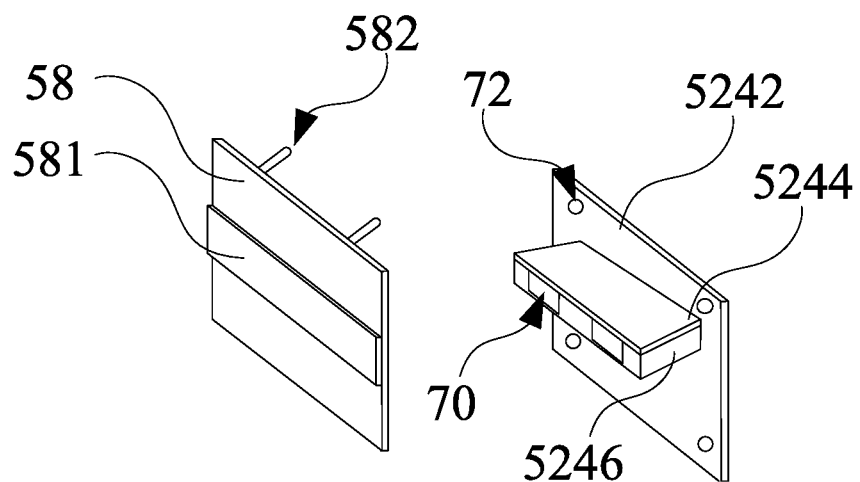
FIG. 7 is a schematic view of a recharging dock for a robot in accordance with another embodiment of the present disclosure.

Referring to FIGS. 5 to 7, the present disclosure further relates to the recharging dock, including a front shell 522, a rear shell 524, and a bottom shell 526. The front shell 522, the rear shell 524, and the bottom shell 526 cooperatively form a main structure 52 of the recharging dock and define an accommodating space.

The bottom shell 526 may include a first extending shell 5261 and a second extending shell 5262 respectively arranged on both sides of the bottom shell 526. Wherein the first extending shell 5261 and the second extending shell 5262 extend along a direction from the rear shell 524 to the front shell 522 and are parallel with a third extending shell 5221 and a fourth extending shell 5222 of the bottom shell 526. The first extending shell 5261 and the third extending shell 5221 cooperatively form a first extending portion 54, and the second extending shell 5262 and the fourth extending shell 5222 cooperatively form a second extending portion 56.

A plurality of recharging electrodes is respectively arranged on the first extending portion 54 and the second extending portion 56. Specifically, an anode 542 is arranged on the first extending portion 54, and a cathode 562 is arranged on the second extending portion 56. When the robot arrives an area between the first extending portion 54 and the second extending portion 56 by conducting an automatic positioning process, the anode 542 and the cathode 562 may be connected. As such, the recharging process may be performed on the robot.

In one example, the recharging dock may further include a processor and at least one sensor (not shown). The sensor is configured to detect a distance between the robot and the recharging dock. The processor is configured to turn on the recharging electrodes upon detecting the distance between the robot and the recharging dock satisfies a predetermining condition, i.e., upon detection magnetic forces. Wherein the sensor may be a Hall sensor. The sensors are respectively arranged on different positions of the recharging dock, and may detect the distances between the robot and the recharging dock from different angles.

As shown in FIG. 6 and FIG. 7, a circuit board 5242 is arranged on the rear shell 524. A top-supporting plate 5244 and a lower-supporting plate 5246 are arranged on the circuit board 5242, wherein the top-supporting plate 5244 and the lower-supporting plate 5246 extend along the direction from the rear shell 524 to the front shell 522 and are parallel with the bottom shell 526. The lower-supporting plate 5246 is arranged with at least two slots 70. The top-supporting plate 5244 covers the lower-supporting plate 5246 to form the at least two signal emission channels, and the signal emitters are arranged on the circuit board 5242.

Specifically, the signal emitters, the top-supporting plate 5244, and the lower-supporting plate 5246 are arranged on the circuit board 5242. The top-supporting plate 5244 and the lower-supporting plate 5246 cooperatively form the signal emission channels. As such, the signal emitters may be arranged within the signal emission channels.

A mask 58 is arranged in parallel with the circuit board 5242. At least two light windows 581 are arranged on the mask 58, wherein the light windows 581 correspond to the openings of the at least two signal emission channels, and the signals may pass through the mask 58 via the light windows 581.

As shown in FIG. 7, a plurality of connecting pillars 582 are arranged on the mask 58, and a plurality of through holes 72 are arranged on the circuit board 5242. The through holes 72 correspond to the connecting pillars 582. When installing the mask 58, the connecting pillars 582 may pass through the through holes 72, and the mask 58 may be fixed on the rear shell 524 by screws. As such, the mask 58 may be fixed on the circuit board 5242 and the rear shell 524.

A through hole 5223 is defined in the front shell 522 and corresponds to the light window 581. The through hole 5223 is configured to accommodate the light window 581.

In another example, the recharging dock may further include a recharging interface configured to connect an external power supply to provide power to the recharging dock.

Figure 8:
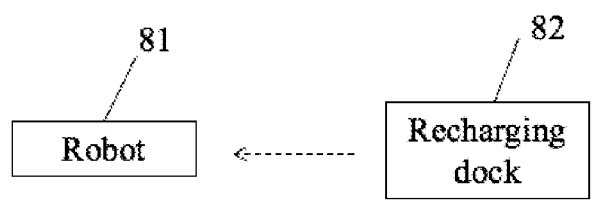
FIG. 8 is a schematic view of a robot system in accordance with one embodiment of the present disclosure.

As shown in FIG. 8, the present disclosure relates to a robot system 80, including the robot 81 and the recharging dock 82.

In one example, the robot may be a sweeping robot or other service-type robots.

Specifically, the signal emitters of the signal emission device of the recharging dock may be infrared light emitting diodes (LEDs). When the at least two infrared LEDs emit the signals via the at least two signal emission channels, infrared light beams of the at least two infrared LEDs may form a first signal area and a second signal area, wherein the first signal area and the second signals respectively corresponds to each of the infrared LEDs. A first distance between the center point of the first opening and the center point of the second opening is greater than the second distance between a center point of the first signal emitter and the center point of the second signal emitter, and thus an overlapping area of the first signal area and the second signal area may be reduced. The robot may obtain infrared signals to determine which signal range that the current position is within, and the robot may determine whether the received infrared signals are emitted from a left-side or from a right-side of the recharging dock. As such, the robot may accurately align with the recharging dock, and may move to the recharging dock more accurate.

The above description is merely the embodiments in the present disclosure, the claim is not limited to the description thereby. The equivalent structure or changing of the process of the content of the description and the figures, or to implement to other technical field directly or indirectly should be included in the claim.

What is claimed is:

1. A recharging robot system, comprising:
 a robot;
 a recharging dock, comprising:
  a signal emission device comprising:
   a first signal emission channel and a second signal emission channel, wherein the first signal emission channel comprises a first opening and the second signal emission channel comprises a second opening;
   at least one first signal emitter arranged within the first signal emission channel and at least one second signal emitter arranged within the second signal emission channel;
   wherein a distance between a center point of the first opening and the center point of the second opening is greater than a distance between a center point of the first signal emitter and a center point of the second signal emitter;
   wherein the first signal emitter is configured to emit first signals outward through the first opening, such that shape of the first opening confines the first signals into a first arc sector, and wherein the second signal emitter is configured to emit second signals outward through the second opening, such that shape of the second opening confines the second signals into a second arc sector;
   wherein a moving direction of the robot is adjusted towards the recharging dock according to which of the first signals in the first arc sector, the second signals in the second arc sector, and both the first and second signals in an overlapping area of the first arc sector and the second arc sector that the robot senses.

2. The recharging robot system according to claim 1, wherein the recharging dock further comprises:
   a front shell, a rear shell, and a bottom shell, wherein the front shell, the rear shell, and the bottom shell cooperatively define an accommodating space; and
   a circuit board arranged on the rear shell, a top-supporting plate, and a lower-supporting plate arranged on the circuit board, wherein the top-supporting plate and the lower-supporting plate extend along a direction parallel with the bottom shell;
   wherein the lower-supporting plate is arranged with at least two slots, the top-supporting plate is configured to cover the lower-supporting plate to form at least two signal emission channels; and
   the first signal emitter and the second signal emitter are arranged on the circuit board.

3. The recharging robot system according to claim 2, wherein the recharging dock further comprises a mask parallel with the circuit board;
   wherein the mask comprises at least two light windows corresponding to openings of the at least two signal emission channels, and signals pass through the mask via the light windows.

4. The recharging robot system according to claim 3, wherein a through hole is defined in the front shell and corresponds to the light window, and the through hole is configured to accommodate the light window.

5. The recharging robot system according to claim 2, wherein the bottom shell comprises:
   a first extending shell and a second extending shell;
   the first extending shell and the second extending shell are arranged on both sides of the bottom shell, and the first extending shell and the second extending shell extend along a direction parallel with the bottom shell;
   the front shell comprises a third extending shell and a fourth extending shell, wherein the third extending shell and the fourth extending shell extend along the direction parallel with the bottom shell;
   the first extending shell and the third extending shell cooperatively form a first extending portion, and the second extending shell and the fourth extending shell cooperatively form a second extending portion;
   a plurality of recharging electrodes are arranged on the first extending portion and the second extending portion.

6. The recharging robot system according to claim 5, wherein the recharging dock further comprises:
   at least one sensor;
   the sensor is configured to detect a distance between the robot and the recharging dock;
   the processor is further configured to turn on the recharging electrodes upon detecting the distance between the robot and the recharging dock satisfies a predetermining condition.

7. The recharging robot system according to claim 6, wherein the sensors are arranged on different positions of the recharging dock, and are configured to detect the distances between the robot and the recharging dock from different angles.

8. The recharging robot system according to claim 1, wherein a shield plate is arranged on openings of the signal emission channels, and the shield plate is configured to partially cover the opening of the signal emission channels.

9. The recharging robot system according to claim 1, wherein the signal emitters of the recharging dock are infrared light emitting diodes.

10. A recharging robot system, comprising:
    a robot;
    a recharging dock, comprising:
    a signal emission device comprising:
        at least two signal emission channels each comprising an opening;
        a signal emitter arranged within each of the at least two signal emission channels;
        wherein the signal emitters are configured to emit signals outward through the corresponding openings, such that shape of the openings confines the signals into arc sectors;
        wherein a distance between two central axes of any two adjacent signal emission channels is gradually increased along a direction facing away the signal emitters;
        wherein the robot detects which arc sectors or overlapping area of the arc sections the robot locates at, through sensing different signals emitted by different signal emitters, and adjusts moving directions towards the recharging dock accordingly.

11. The recharging robot system according to claim 10, wherein the recharging dock further comprises:
    a front shell, a rear shell, and a bottom shell, wherein the front shell, the rear shell, and the bottom shell cooperatively define an accommodating space; and
    a circuit board arranged on the rear shell, a top-supporting plate and a lower-supporting plate arranged on the circuit board, wherein the top-supporting plate and the lower-supporting plate extend along a direction parallel with the bottom shell;
    the lower-supporting plate is arranged with at least two slots, and the top-supporting plate is configured to cover the lower-supporting plate to form at least two signal emission channels; and
    the signal emitters are arranged on the circuit board.

12. The recharging robot system according to claim 11, wherein the recharging dock further comprises a mask parallel with the circuit board;
    wherein the mask comprises at least two light windows corresponding to openings of the at least two signal emission channels, and signals pass through the mask via the light windows.

13. The recharging robot system according to claim 12, wherein a through hole is defined in the front shell and corresponds to the light window, and the through hole is configured to accommodate the light window.

14. The recharging robot system according to claim 11, wherein the bottom shell comprises:
    a first extending shell and a second extending shell;
    the first extending shell and the second extending shell are arranged on both sides of the bottom shell, and the first extending shell and the second extending shell extend along a direction parallel with the bottom shell;
    the front shell comprises a third extending shell and a fourth extending shell, wherein the third extending shell and the fourth extending shell extend along the direction parallel with the bottom shell;
    the first extending shell and the third extending shell cooperatively form a first extending portion, and the second extending shell and the fourth extending shell cooperatively form a second extending portion;

a plurality of recharging electrodes are arranged on the first extending portion and the second extending portion.

15. The recharging robot system according to claim 14, wherein the recharging dock further comprises:
at least one sensor;
the sensor is configured to detect a distance between the robot and the recharging dock;
the processor is further configured to turn on the recharging electrodes upon detecting the distance between the robot and the recharging dock satisfies a predetermining condition.

16. The recharging robot system according to claim 15, wherein the sensors are arranged on different positions of the recharging dock, and are configured to detect the distances between the robot and the recharging dock from different angles.

17. The recharging robot system according to claim 10, wherein a shield plate is arranged on opening of the signal emission channels, and the shield plate is configured to partially cover the opening of the signal emission channels.

18. The recharging robot system according to claim 10, wherein the signal emitters of the recharging dock are infrared light emitting diodes.

* * * * *